US008112366B2

(12) United States Patent
Hollingsworth et al.

(10) Patent No.: US 8,112,366 B2
(45) Date of Patent: Feb. 7, 2012

(54) EXPERT SYSTEM AND VISUALIZATION FOR MULTI-SERVER CAPACITY MANAGEMENT

(75) Inventors: Matt Hollingsworth, Redmond, WA (US); Colleen Hamilton, Kirkland, WA (US); John M. Oslake, Redmond, WA (US); Shawn Bice, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 782 days.

(21) Appl. No.: 12/242,826

(22) Filed: Sep. 30, 2008

(65) Prior Publication Data

US 2010/0082505 A1    Apr. 1, 2010

(51) Int. Cl.
*G06F 17/00* (2006.01)
*G06F 17/20* (2006.01)

(52) U.S. Cl. .......................................................... 706/11

(58) Field of Classification Search ........................ None
See application file for complete search history.

(56) References Cited

U.S. PATENT DOCUMENTS

| | | | |
|---|---|---|---|
| 6,148,335 A | 11/2000 | Haggard et al. | |
| 7,092,975 B2 | 8/2006 | Bradley et al. | |
| 7,124,368 B1 | 10/2006 | Subramanian et al. | |
| 7,167,915 B2 | 1/2007 | Bendich et al. | |
| 7,219,300 B2 | 5/2007 | Arquié et al. | |
| 2009/0122706 A1* | 5/2009 | Alfano et al. | 370/237 |
| 2010/0198752 A1* | 8/2010 | Digon et al. | 705/412 |

OTHER PUBLICATIONS

Siwiki, "CPU/Processor", 2007, pp. 8, http://www.solarisinternals.com/wiki/index.php/CPU/Processor.*
Trader, "How to Calculate CPU Utilization", 2004, pp. 7, http://www.design-reuse.com/articles/8289/how-to-calculate-cpu-utilization.html.*
"StorStac OS", retrieved at <<http://www.intransa.com/technology/software.php>>, © 2008 Intransa, Inc., 8 pages.
"Maximizing SQL Server Performance", retrieved at <<http://www.dell.com/downloads/global/power/ps4q05-20050272-Symantec.pdf>>, Dell Power Solutions, Nov. 2005, 3 pages.
"Achieve Ultimate Microsoft SQL Server Performance", retrieved at <<http://www.sqlsentry.net/files/sql-sentry-product-datasheet.pdf>>, © 2008 SQL Sentry, Inc., 4 pages.
"Tuning Microsoft SQL Server 2005 Performance", retrieved at http://www.uk.hds.com/assets/pdf/tuning-microsoft-sql-server-2005-performance-wp.pdf>>, Hitachi Data Systems, 13 pages.

* cited by examiner

*Primary Examiner* — Jeffrey A Gaffin
*Assistant Examiner* — Li-Wu Chang
(74) *Attorney, Agent, or Firm* — Toler Law Group, PC (57) ABSTRACT

A system is disclosed that includes an interface to receive a resource governance rule applicable to one or more hardware resources supporting a monitored software application. The system includes utilization logic to measure usage of a particular hardware resource by the monitored software application. An available utilization of the particular hardware resource is determined based on the resource governance rule, and a total utilization of the particular hardware resource is also determined. One or more utilization metrics are determined based on historical usage of the particular hardware resource as compared to a governed capacity and a non-governed capacity available to the particular hardware resource. The system also includes recommendation logic to determine a recommended action to be taken with respect to the monitored software application.

12 Claims, 8 Drawing Sheets

EXPERT SYSTEM AND VISUALIZATION FOR MULTI-SERVER CAPACITY MANAGEMENT

BACKGROUND

Software applications are typically managed independently from the computer system hardware and on which they depend. In addition, multiple software applications may share software and hardware resources. The lack of integrated management tools across software applications, operating systems, and computer system hardware commonly results in several problems. For example, hardware is often over-provisioned to mitigate possible capacity bottlenecks, resulting in wasted hardware resources. The serviceability and predictability of software applications may be negatively affected by unexpected capacity bottlenecks in the underlying software and hardware. Further still, lack of integrated management tools may result in an inability to understand the required adjustments to capacity related items.

SUMMARY

The present disclosure describes a visualization technique which represents the relationship of software applications to the individual operating system and hardware capacity utilized over varying time intervals. For example, the visualization technique can display the relationship between hardware capacity utilization rates and software application components such as files, storage volumes, and physical storage devices from a single user interface. The capacity of the software application optionally also displays visualizations which include software based hardware utilization restrictions that are imposed by the software applications. An example of a software based hardware restriction is a resource governing rule that limits the CPU resources accessible to the software application or limits the space available to a file which is utilized by the software application. The invention presents software based hardware utilization restrictions as an allocated subset within the larger less restrictive total capacity available on the hardware resource. Utilization targets are captured through rules, policies, and best practices. The visualization technique highlights the violations of the utilization rules, policies, and best practices and generates one or more actions which serve to rectify the violations by changing the relationship between the application software and the hardware. The structure of the visualization can be modified to fit a particular domain of capacity analysis by restricting the particular hardware and software components displayed and changing the manner in which utilization statistics are aggregated.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

In a particular embodiment, a system is disclosed that includes an interface to receive a resource governance rule applicable to one or more hardware resources supporting a monitored software application. The system includes utilization logic to measure usage of a particular hardware resource by the monitored software application. An available utilization of the particular hardware resource is determined based on the resource governance rule and a total utilization of the particular hardware. One or more utilization metrics are determined based on a historical usage of the particular hardware resource as compared to a governed capacity and a non-governed capacity available to the particular hardware resource. The system also includes recommendation logic to determine a recommended action to be taken with respect to the monitored software application based on one or more rules.

In another particular embodiment, a method is disclosed that includes identifying consumers of a resource. Usage of the resource by each consumer of the resource is monitored. A total utilization of the resource by each of the consumers is determined based on a model of the resource and of a computer system. A resource governed utilization of the resource by each of the consumers is determined based on the model of the resource and of the computer system. The method also includes displaying the total utilization of the resource and the resource governed utilization of the resource for each of the consumers of the resource in a single view.

In another particular embodiment, a method of displaying a plurality of user modifiable utilization views of a monitored software application is disclosed. Each of the plurality of user modifiable utilization views are customizable to fit a domain of analysis. The views may be customized by identifying one or more resource types of multiple resource components, determining a desired ordering of the one or more resource types within a hierarchy of types, and filtering one or more details of the multiple resource components to create a customized view. Each of the plurality of user modifiable utilization views are displayed in one or more graphical user interfaces. A user can navigate between each of the plurality of user modifiable utilization views to dynamically construct related target analysis views including filtered details across one or more other domains of analysis.

Figure 1:
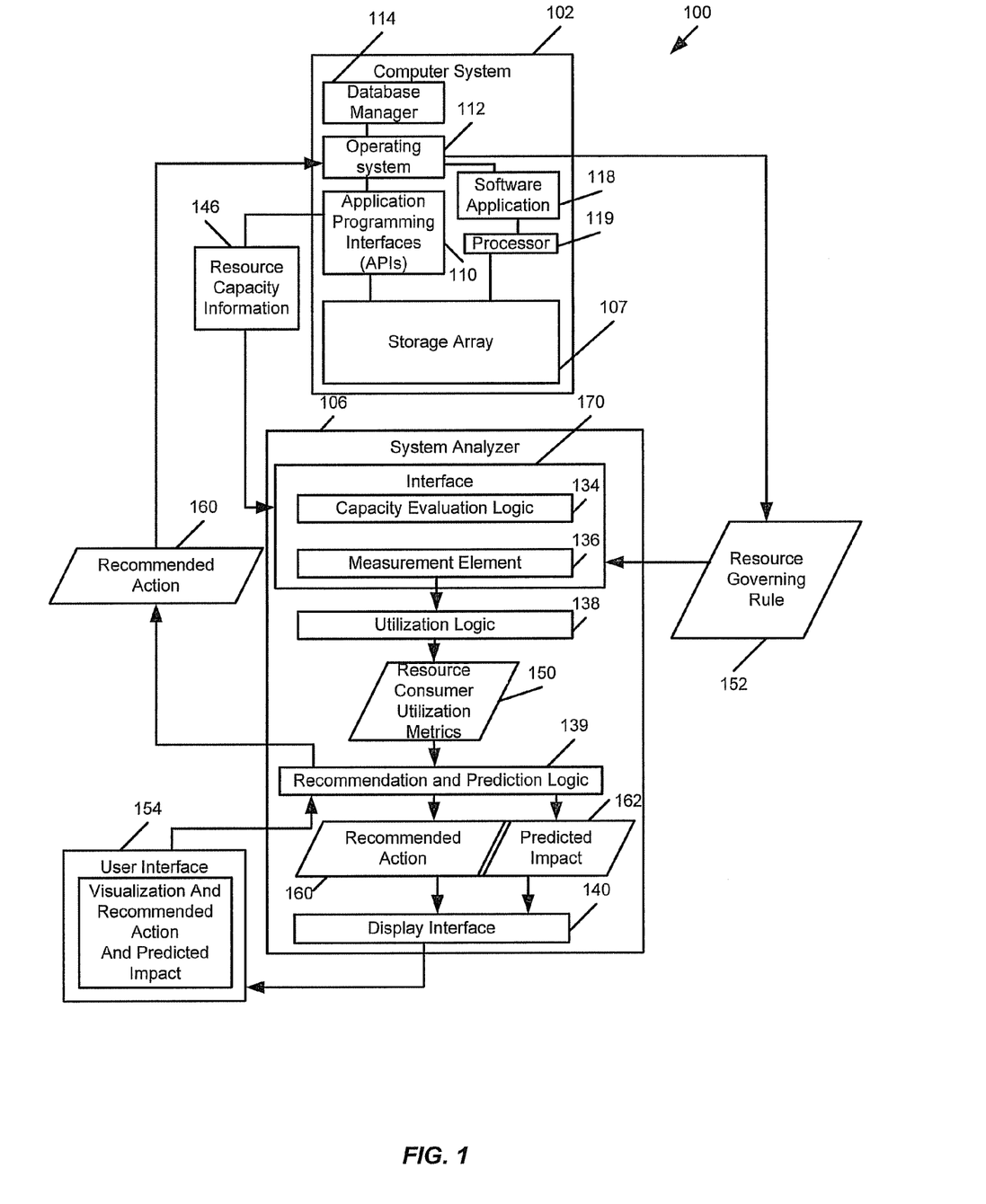
FIG. 1 is a block diagram to illustrate a first particular embodiment of a system that measures and displays resource capacity utilization.

Referring to FIG. 1, a view of a first particular embodiment of a system 100 that measures and displays resource capacity is illustrated. The system 100 includes a system analyzer 106 that includes an interface 170, utilization logic 138, and recommendation and prediction logic 139. The interface 170 is adapted to receive a resource governance rule applicable to one or more hardware resources supporting a monitored software application. The system analyzer 106 communicates with a computer system 102 via the interface 170 and communicates with a user interface 154 via a display interface 140.

The interface 170 receives a resource governance rule 152 applicable to one or more hardware resources supporting a monitored software application 118. The utilization logic 138 measures usage of a particular hardware resource by the monitored software application 118. The utilization logic 138 determines an available utilization of the particular hardware resource based on the resource governance rule 152 and determines a total utilization of the particular hardware resource. The utilization logic 138 determines one or more utilization metrics 150 based on a historical usage of the particular hardware resource as compared to a governed capacity available to the particular hardware resource and a non-governed capacity available to the particular hardware resource.

In a particular embodiment, the resource governance rule allocates a limited amount of processor capacity to the software application 118. In another particular embodiment, the software application 118 is allocated a first percentage usage of a processor, and the allocated utilization metric is determined by calculating a percentage of the processor that is used by the software application. For example, referring to FIG. 1, the software application 118 may be allocated a percentage of the processor 119 of computer system 102.

The resource governed utilization may include a Microsoft SQL Server utilization after taking into account software based restrictions on the amount of hardware available to a Microsoft SQL Server instance. For example, in the case of central processing unit (CPU) measurement, the resource governance rule may restrict CPU capacity available to the Microsoft SQL Server instance to a subset of the total CPU capacity via several means. For example, the number of CPUs available may be reduced via Microsoft SQL Server CPU affinity settings, or using operating environments, such as virtual machines (VMs) that reduce the number of CPUs available to Microsoft SQL Server. Alternatively, the resource governance rule may restrict CPU capacity available to the Microsoft SQL Server instance to a subset of total capacity by running Microsoft SQL Server with Microsoft Windows or Microsoft SQL Server resource governing the CPU capacity to restrict the amount of the physical CPU that can be allocated to Microsoft SQL Server during periods of high load. If Microsoft SQL Server is allocated one CPU, and the computer contains two CPUs, then the measurement of allocated CPU capacity may be calculated as a percentage of the one CPU that is used by Microsoft SQL Server. Similarly, as an example, if resource governing restricts the total CPU utilization of Microsoft SQL Server to 50% on a computer and Microsoft SQL Server runs on only one processor at a time, then the measurement of allocated CPU capacity may be calculated as a percentage of one CPU that is used by Microsoft SQL Server when the system overall is experiencing 100% CPU utilization.

The recommendation and prediction logic 139 determines a recommended action 160 to be taken with respect to the monitored software application 118 based on one or more rules. For example, the one or more rules may include one or more deployment configuration constraints and one or more resource allocation best practices. The one or more rules may be defined by the system or may be definable or modifiable by a user. In a particular embodiment, the recommended action 160 includes re-allocating hardware resources of the computer system 102. In another particular embodiment, the recommended action 118 includes moving the software application 118 and files associated with the software application 118 to a second computer system (e.g., a computer system other than the computer system 102 of FIG. 1).

In a particular embodiment, the recommendation and prediction logic 139 estimates a predicted impact 162 of executing the recommended action 160. The user interface 154 may display a predicted utilization view of related hardware resources and software applications of the computer system 102 based on the predicted impact 162 of executing the recommended action 160. The predicted impact 162 of executing the recommended action 160 may allow an administrator to decide whether to execute the recommended action 160. For example, if the administrator considers the predicted impact 162 unacceptable, the administrator may choose not to execute the recommended action 160. If the administrator determines that the predicted impact 162 is acceptable, the administrator may choose to execute the recommended action 160.

In a particular embodiment, the user interface 154 displays the one or more utilization metrics 150 and the recommended action 160. The user interface 154 may include a graphical user interface or a command line interface. The one or more utilization metrics 150 may include a resource governed utilization of a particular hardware resource, and the user interface 154 may display the resource governed utilization of the particular hardware resource. The user interface 154 may further display a contribution of each of one or more consumers of the particular hardware resource relative to the total utilization of the particular hardware resource and the resource governed utilization of the particular hardware resource. The one or more utilization metrics 150 may be determined periodically and displayed periodically at the user interface 154. In another particular embodiment, the utilization logic 138 detects a usage of the monitored software application 118 that approaches a hardware resource limit before the usage exceeds the hardware resource limit, and the recommendation and prediction logic 139 automatically executes the recommended action 160 before the usage exceeds the hardware resource limit. For example, automatically executing the recommended action may include automatically re-allocating hardware resources of the computer system 112 (e.g., a first computer system) and/or automatically moving the software application 118 and files associated with the software application 118 to a second computer system. As shown in FIG. 1, the recommendation and prediction logic 139 may automatically execute the recommended action 160 by communicating with an operating system 112 of the computer system 102.

In one embodiment, the computing system 102 includes a set of storage elements available for use by a software application 118 of the computer system 102. In a particular embodiment, the software application 118 includes an operating system file residing on an operating system volume, and the volume is constrained to a predetermined number of input/output storage accesses per second. In the particular embodiment shown in FIG. 1, the computer system 102 also includes Application Programming Interfaces (APIs) 10, operating system 112, a database manager 114, one or more processors 119, and a storage array 107.

Figure 2:
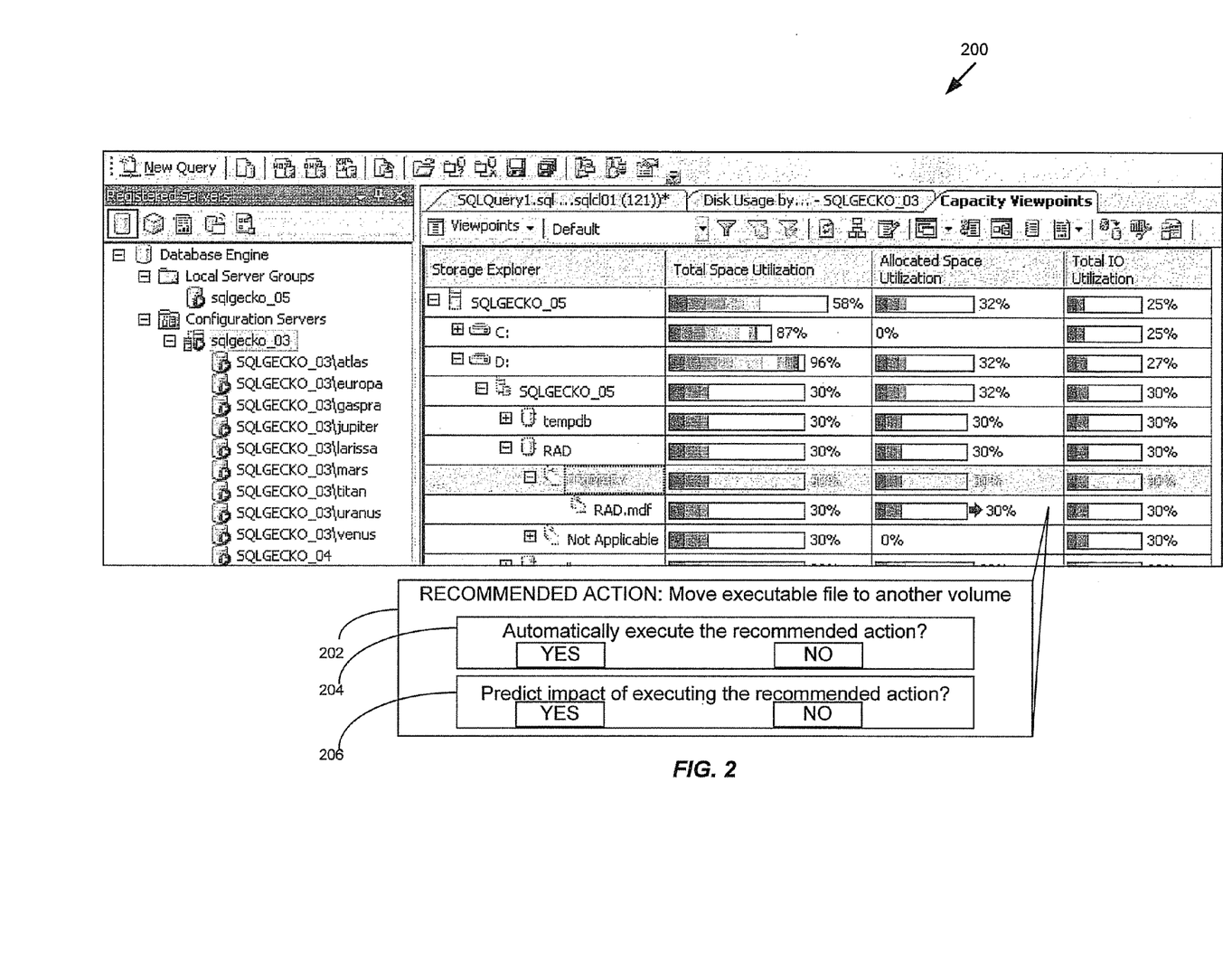
FIG. 2 is a screen view diagram to illustrate a particular embodiment of a visual display that includes a recommended action and a predicted impact of the recommended action.

Referring to FIG. 2, a view of a graphical user interface is illustrated at 200. The graphical user interface 200 displays an example of a recommended action 202. In one embodiment, the graphical user interface 200 of FIG. 2 is the user interface 154 of FIG. 1. In one embodiment, the recommended action 202 displayed in FIG. 2 is the recommended action 160 determined in FIG. 1. In FIG. 2, a user is presented with a user interface 204 that displays an option of automatically executing the recommended action 202. Alternatively, the recommended action 202 may be executed automatically without user input. In one embodiment, the recommended action 202 may be automatically executed by a computing system (e.g., computer system 102 in FIG. 1). In FIG. 2, the user is also presented with a user interface 206 that displays an option of estimating a predicted impact of executing the recommended action 202. For example, upon selection, the user may be presented with a predicted utilization view of related hardware resources and software applications of the system based on the predicted impact of executing the recommended action 202.

In a particular embodiment, the recommended action 202 includes re-allocating hardware resources of a computer system. In alternative embodiments, the recommended action may include moving a software application and files associated with the software application to a second computer system. In another particular embodiment, a usage of the monitored software application that approaches a hardware resource limit is detected before the usage exceeds the hardware resource limit. The recommended action 202 is automatically executed before the usage exceeds the hardware resource limit.

Figure 3:
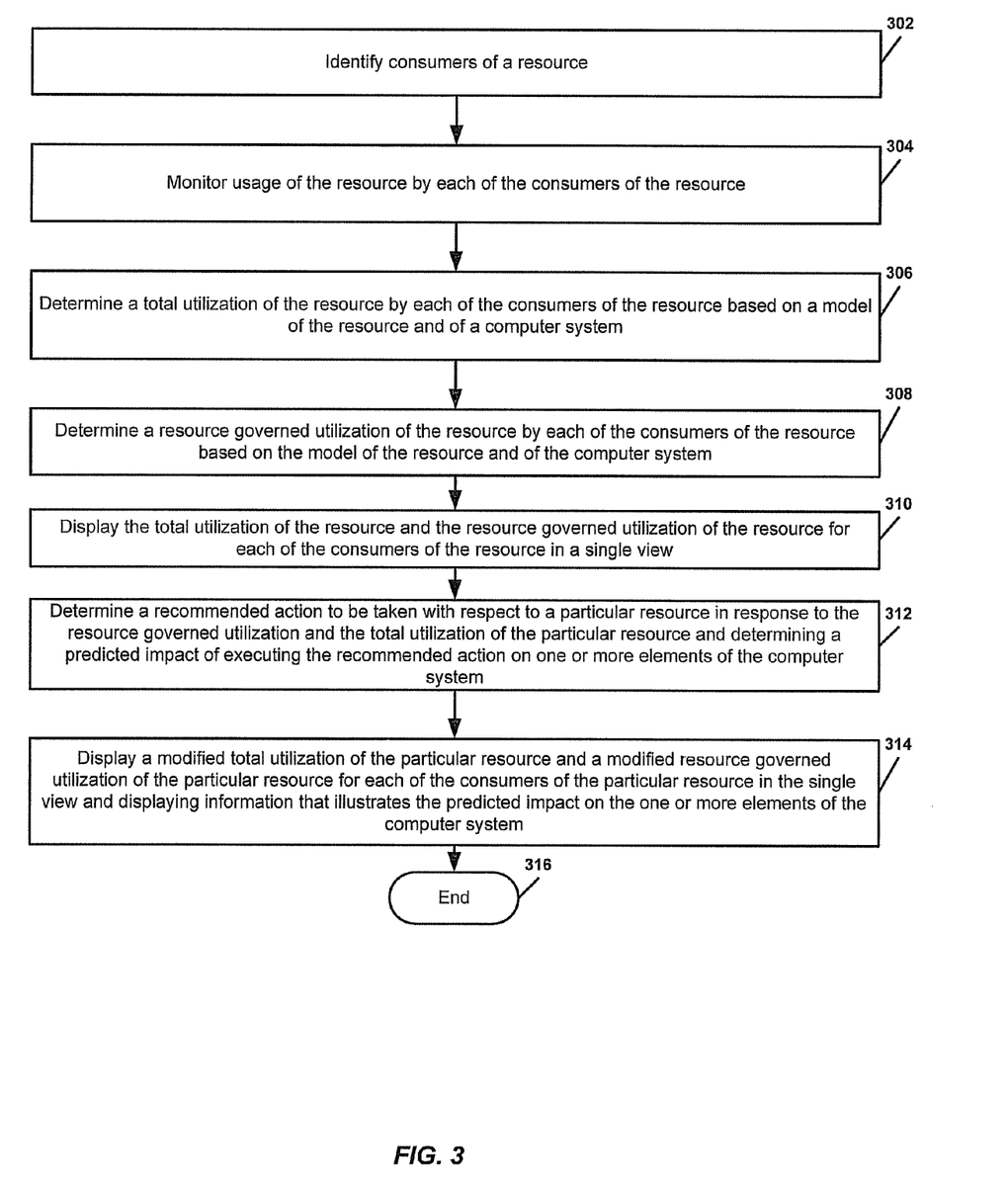
FIG. 3 is a flow diagram to illustrate a first particular embodiment of a method of determining a resource governed utilization of a resource.

Referring to FIG. 3, a flow diagram to illustrate a first particular embodiment of a method of determining a resource governed utilization of a resource is illustrated.

At 302, the method includes identifying consumers of a resource. The consumers of the resource may be one or more applications (e.g., software applications, such as database applications). The resource may include a processor device, a memory device, a storage device, or network device. At 304, the method includes monitoring usage of the resource by each of the consumers of the resource. The method includes determining a total utilization of the resource by each of the consumers of the resource based on a model of the resource and of a computer system, at 306. The method includes determining a resource governed utilization of the resource by each of the consumers of the resource based on the model of the resource and of the computer system, at 308.

In one embodiment, the resource governed utilization is a Microsoft SQL Server utilization after taking into account any software based restrictions on the amount of hardware available to an Microsoft SQL Server instance. For example, in the case of central processing unit (CPU) measurement, the resource governance rule may restrict CPU capacity available to the Microsoft SQL Server instance to a subset of the total CPU capacity via several means. For example, the number of CPUs available may be reduced via Microsoft SQL Server CPU affinity settings, or using operating environments such as virtual machines (VMs) which reduce the number of CPUs available to Microsoft SQL Server. Alternatively, the resource governance rule may restrict CPU capacity available to the Microsoft SQL Server instance to a subset of total capacity by running Microsoft SQL Server with Microsoft Windows or Microsoft SQL Server resource governing CPU capacity to restrict the amount of the physical CPU which can be allocated to Microsoft SQL Server during periods of high load. If Microsoft SQL Server is allocated one CPU, and the computer contains two CPUs, then the measurement of allocated CPU capacity may be calculated as a percentage of the one CPU that is used by Microsoft SQL Server. Similarly, as an example, if resource governing restricts the total CPU utilization of Microsoft SQL Server to 50% on a computer and Microsoft SQL Server runs on only one processor at a time, then the measurement of allocated CPU capacity may be calculated as a percentage of one CPU that is used by Microsoft SQL Server when the system overall is experiencing 100% CPU utilization.

At 310, the method further includes displaying the total utilization of the resource and the resource governed utilization of the resource for each of the consumers of the resource in a single view. In a particular embodiment, the method further includes determining a recommended action to be taken with respect to a particular resource in response to the resource governed utilization and the total utilization of the particular resource and determining a predicted impact of executing the recommended action on one or more elements of the computer system, at 312. At 314, in another particular embodiment, the method further includes displaying a modified total utilization of the particular resource and a modified resource governed utilization of the particular resource for each of the consumers of the particular resource in the single view and displaying information that illustrates the predicted impact on the one or more elements of the computer system. The method ends at 316.

Figure 4:
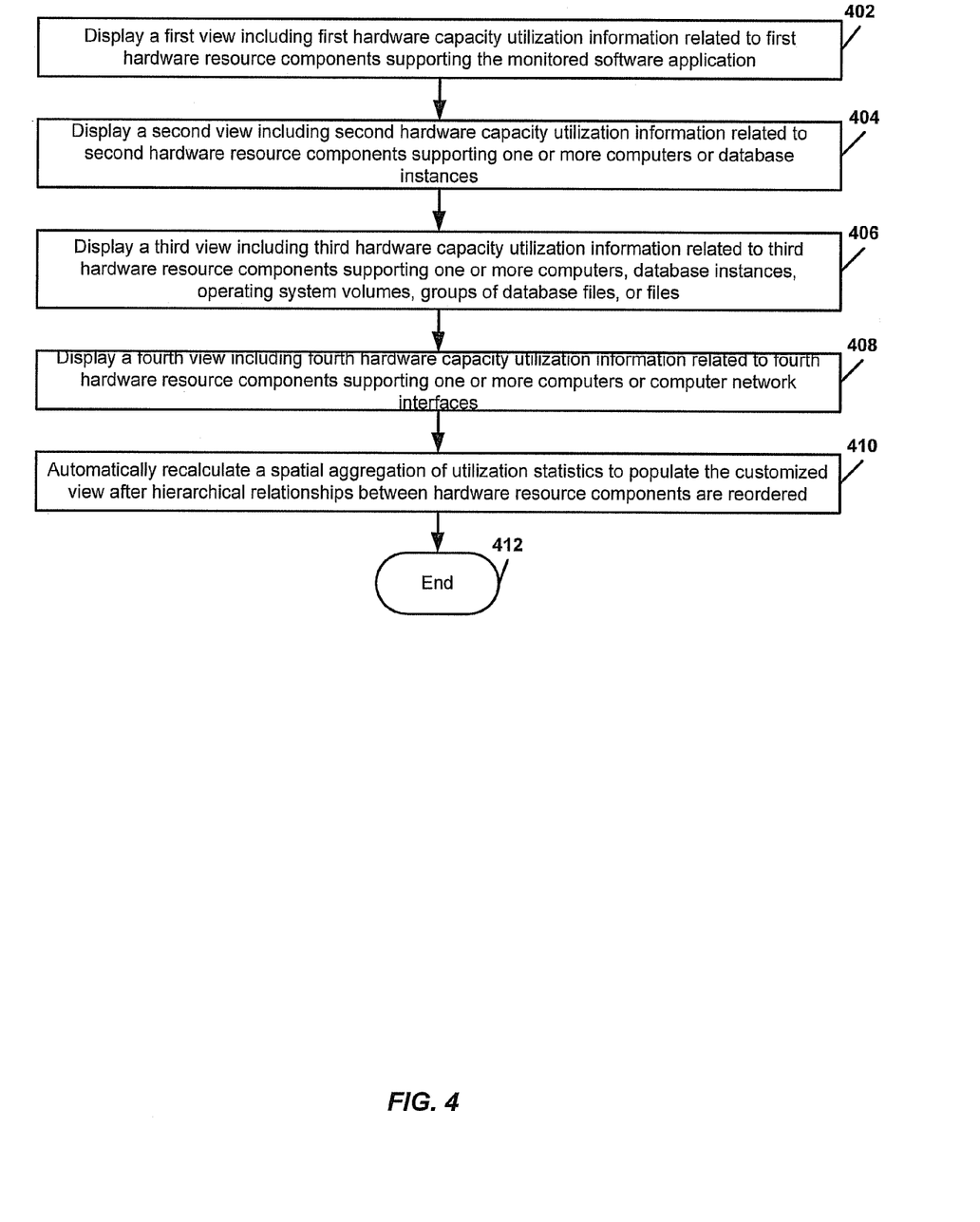
FIG. 4 is a flow diagram to illustrate a first particular embodiment of a method of displaying a plurality of user modifiable utilization views of a monitored software application.
Figure 5:
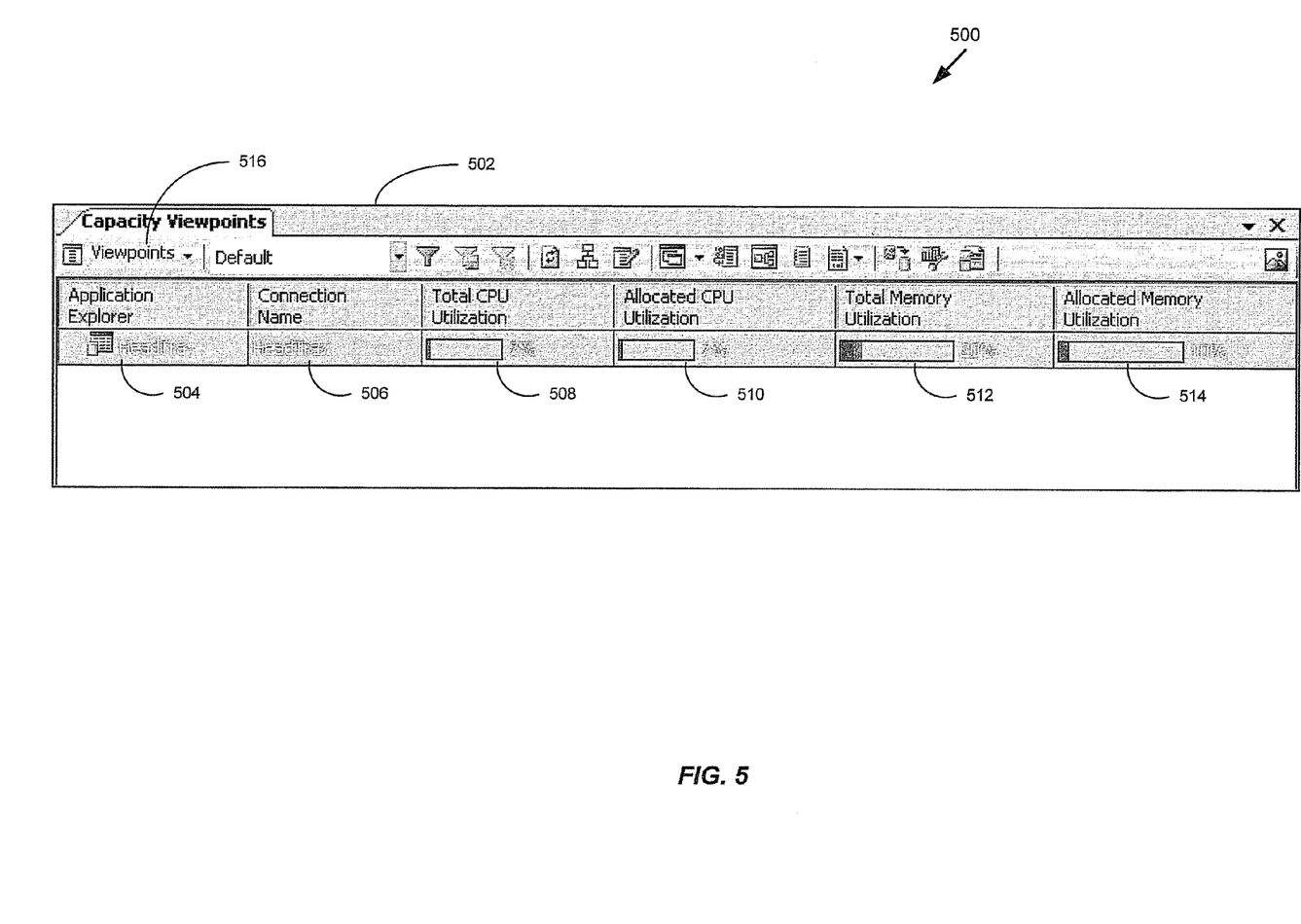
FIG. 5 is a screen view diagram to illustrate a particular embodiment of a visual display that includes a first dynamic utilization view of database components.
Figure 6:
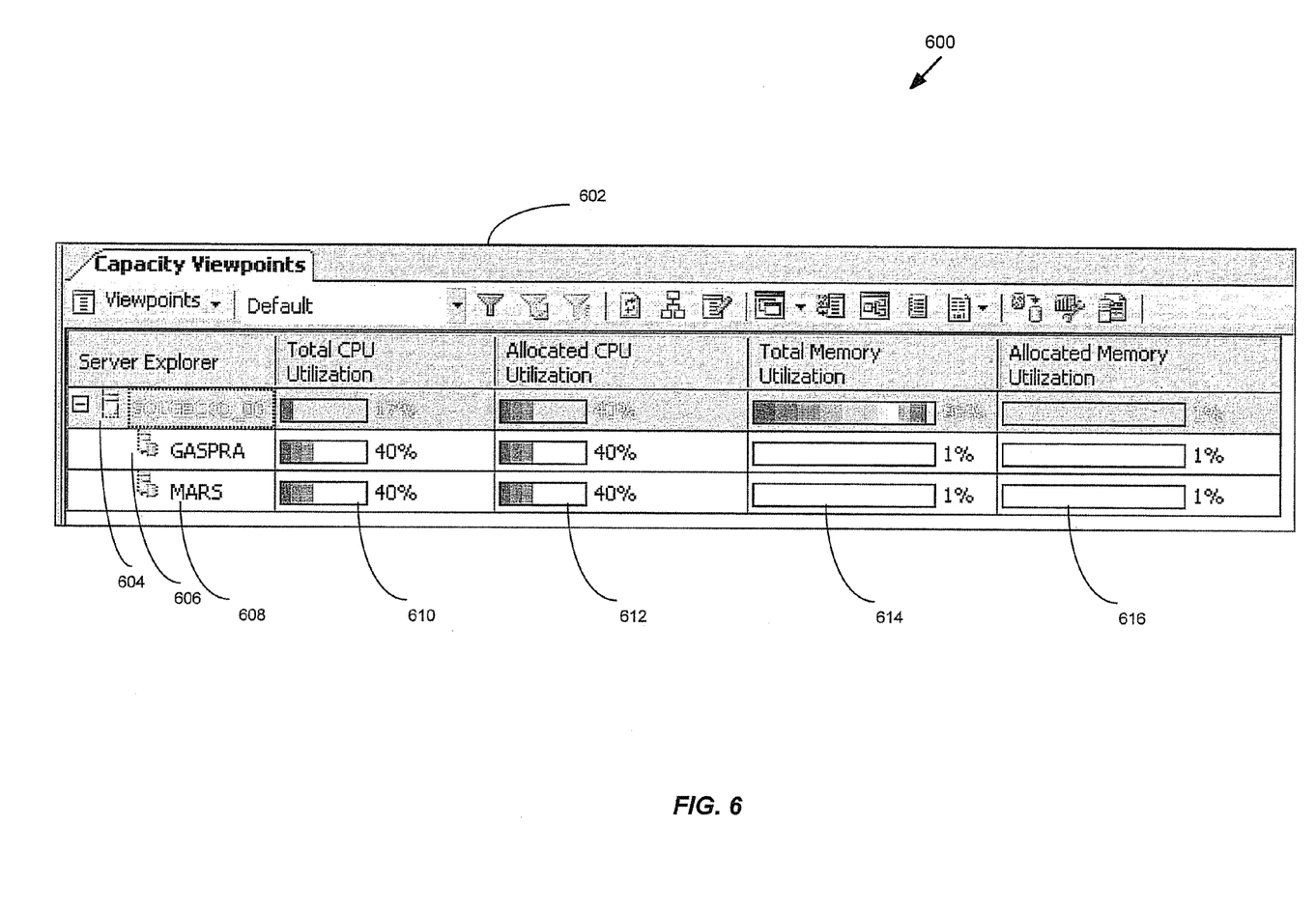
FIG. 6 is a screen view diagram to illustrate a particular embodiment of a visual display that includes a second dynamic utilization view of database components.
Figure 8:
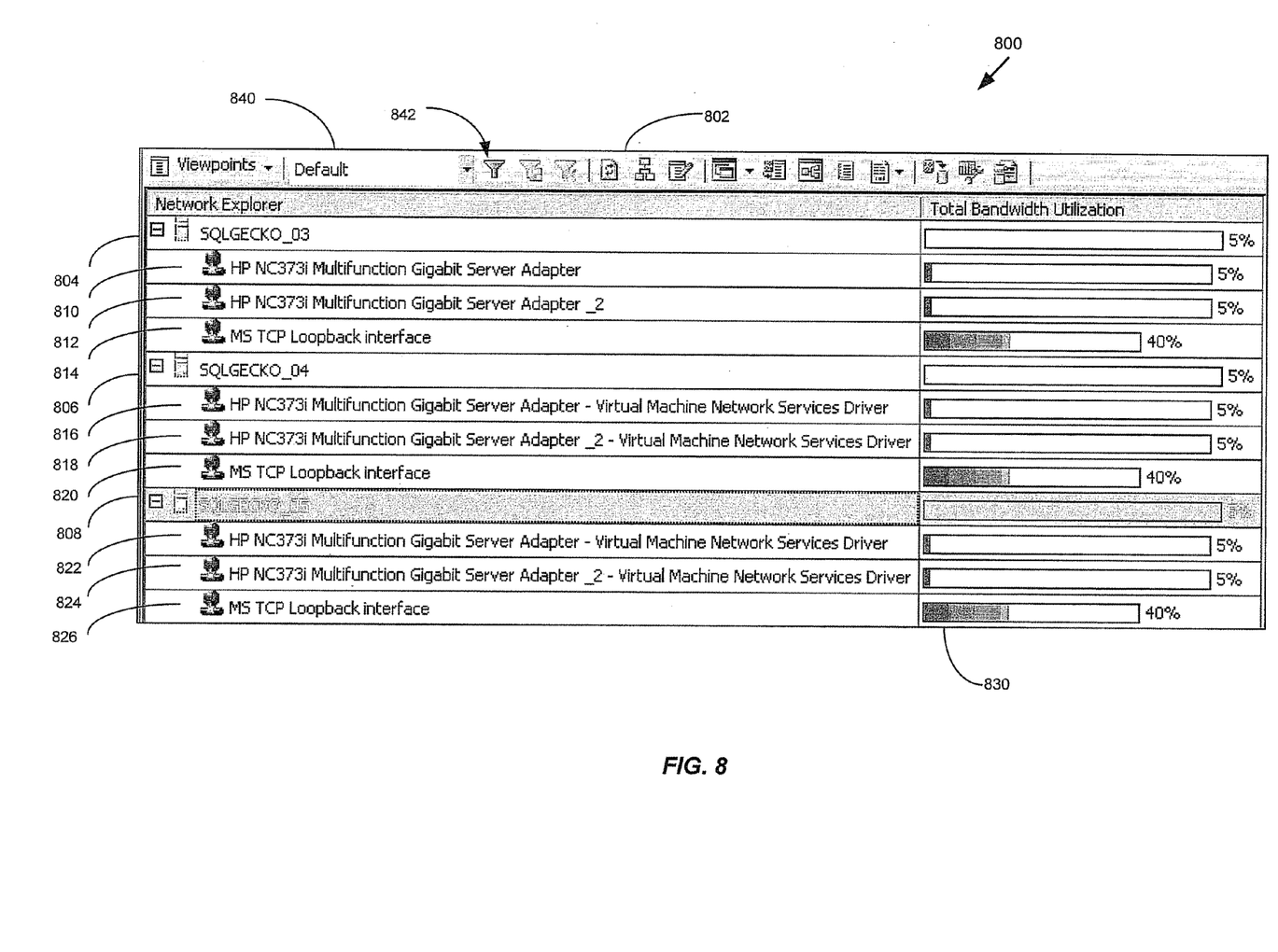
FIG. 8 is a screen view diagram to illustrate a particular embodiment of a visual display that includes a fourth dynamic utilization view of database components.

Referring to FIG. 4, a method of displaying a plurality of user modifiable utilization views of a monitored software application is illustrated. Each of the plurality of user modifiable utilization views are customizable to fit a domain of analysis. For example, each of the views may be customized by identifying one or more resource types of multiple resource components, determining a desired ordering of the one or more resource types within a hierarchy of types, and filtering one or more details of the multiple resource components to create a customized view. Each of the plurality of user modifiable utilization views are displayed in one or more graphical user interfaces. A user can navigate between each of the plurality of user modifiable utilization views to dynamically construct related target analysis views including filtered details across one or more other domains of analysis. For example, a user can initially view a utilization metric of a particular software application in the hardware capacity utilization view as shown in FIG. 5. Upon selection or other input, the user can obtain further detailed information on the particular software application, such as by accessing a filtered and customized detailed view based on further information related to performance of the software application. For example, a user can select or construct a view of database instances that support the particular software application, so that the user can view information related to the particular software application in a different domain (e.g. the database instance domain), as shown in FIG. 6. Another exemplary domain is the network bandwidth domain, as shown in FIG. 8. Accordingly, a dynamic presentation of utilization information is customized and may be presented across various domains of analysis for visualization.

In a particular embodiment, the user modifiable utilization views are provided by a user interface that allows new elements or properties to be added to an extensible fabric meta-data model without requiring changes to fabric program executable code associated with the extensible fabric meta-data model. In another particular embodiment, the user modifiable utilization views are provided by a user interface that presents fabric actions of an extensible fabric meta-data model and that allows new custom executable program code to be launched to operate on elements of the extensible fabric meta-data model without requiring changes to the fabric program executable code. In another particular embodiment, the user modifiable utilization views are provided by a user interface that presents a fabric dashboard that allows one or more new summaries of fabric elements of an extensible fabric meta-data model to be presented without requiring changes to the fabric program executable code. Thus, an extensible fabric meta-data model may be used to support various visualization features.

In the particular embodiment illustrated in FIG. 4, the method includes displaying a first view including first hardware capacity utilization information related to first hardware resource components supporting the monitored software application, at 402. For example, the first hardware capacity utilization information displayed may include processor utilization metrics, storage I/O capacity utilization metrics, storage space utilization metrics, and network bandwidth utilization metrics. In the particular embodiment illustrated in FIG. 4, the method also includes displaying a second view including second hardware capacity utilization information related to second hardware resource components supporting one or more computers or database instances, at 404. In the particular embodiment illustrated in FIG. 4, the method also includes displaying a third view including third hardware capacity utilization information related to third hardware resource components supporting one or more computers, database instances, operating system volumes, groups of database files, or files, as shown at 406. In the particular embodiment illustrated in FIG. 4, the method also includes displaying a fourth view including fourth hardware capacity utilization information related to fourth hardware resource components supporting one or more computers or computer network interfaces, as shown at 408.

In the particular embodiment illustrated in FIG. 4, at 410, the method also includes automatically recalculating a spatial aggregation of utilization statistics to populate the customized view after hierarchical relationships between hardware resource components are reordered, as shown at 410. The method ends at 412.

In another particular embodiment, the first view, the second view, the third view, and the fourth view are displayed in one or more graphical user interfaces. Examples of the first view, the second view, the third view, and the fourth view are illustrated in FIGS. 5-8, as described below.

Referring to FIG. 5, a particular illustrative embodiment of a first view 500 displays hardware capacity utilization information related to hardware resource components supporting a database application.

In a particular embodiment, the first view 500 includes a first graphical user interface 502 that includes a database application visualization. The database application visualization includes a first field that shows a database application 504. For example, the database application 504 in FIG. 5 is named "HeadTrax" with an associated connection name 506 of the same name. The first view 500 also includes a second field that shows one or more total hardware capacity utilization metrics of the database application 504. For example, in FIG. 5, the first view 500 includes a first total hardware capacity utilization metric 508 and a second total hardware capacity utilization metric 512. For example, the first total hardware capacity utilization metric 508 in FIG. 5 is a total CPU utilization metric. As a further example, the second total hardware capacity utilization metric 512 in FIG. 5 is a total memory utilization metric. The first view 500 also includes a third field that shows one or more allocated hardware capacity utilization metrics of the database application. For example, in FIG. 5, the first view 500 includes a first allocated hardware capacity utilization metric 510 and a second allocated hardware capacity utilization metric 514 are shown. For example, the first allocated hardware capacity utilization metric 510 in FIG. 5 is an allocated CPU utilization metric. As a further example, the second allocated hardware capacity utilization metric 514 is an allocated memory utilization metric.

In alternative embodiments, the hardware capacity utilization information may include storage I/O capacity utilization metrics, storage space utilization metrics, and network bandwidth utilization metrics.

Referring to FIG. 6, a particular illustrative embodiment of a second view 600 displays hardware capacity utilization information related to hardware resource components supporting one or more computers or database instances.

In a particular embodiment, the second view 600 includes a second graphical user interface 602 that includes a first field that shows a computer 604. For example, the computer 604 in FIG. 6 is named "SQLGECKO_03". The second view 600 also includes a second field that shows one or more Microsoft SQL Server instances. In the embodiment shown in FIG. 6, the second field shows a first Microsoft SQL Server instance 606 and a second Microsoft SQL Server instance 608. For example, in FIG. 6, the first Microsoft SQL Server instance 606 is named "GASPRA" and the second Microsoft SQL Server instance 608 is named "MARS". The second view 600 also includes a third field that shows one or more total hardware capacity utilization metrics of the computer and the one or more Microsoft SQL Server instances. For example, in FIG. 6, the second view 600 includes a total hardware capacity utilization metric 610 and a second total hardware capacity utilization metric 614. For example, the first total hardware capacity utilization metric 610 in FIG. 6 is a total CPU utilization metric. As a further example, the second total hardware capacity utilization metric 614 in FIG. 6 is a total memory utilization metric.

The second view 600 also includes a fourth field that shows one or more allocated hardware capacity utilization metrics of the computer and the one or more Microsoft SQL Server instances. In the embodiment shown in FIG. 6, the fourth field shows an allocated hardware capacity utilization metric 612 and an allocated hardware capacity utilization metric 616. For example, the first allocated hardware capacity utilization metric 612 is an allocated CPU utilization metric. As a further example, the second allocated hardware capacity utilization metric 616 is an allocated memory utilization metric.

In a particular embodiment, a user can switch between the first view, the second view, the third view, and the fourth view. For example, the user can switch between the first view 500 of FIG. 5 and the second view 600 of FIG. 6 by clicking on a viewpoint tab 516 as in FIG. 5. Further, the user may change the view of the hardware capacity utilization information displayed by clicking on the viewpoint tab 516. For example, hardware capacity utilization information may include processor utilization metrics, storage I/O capacity utilization metrics, storage space utilization metrics, and network bandwidth utilization metrics.

Figure 7:
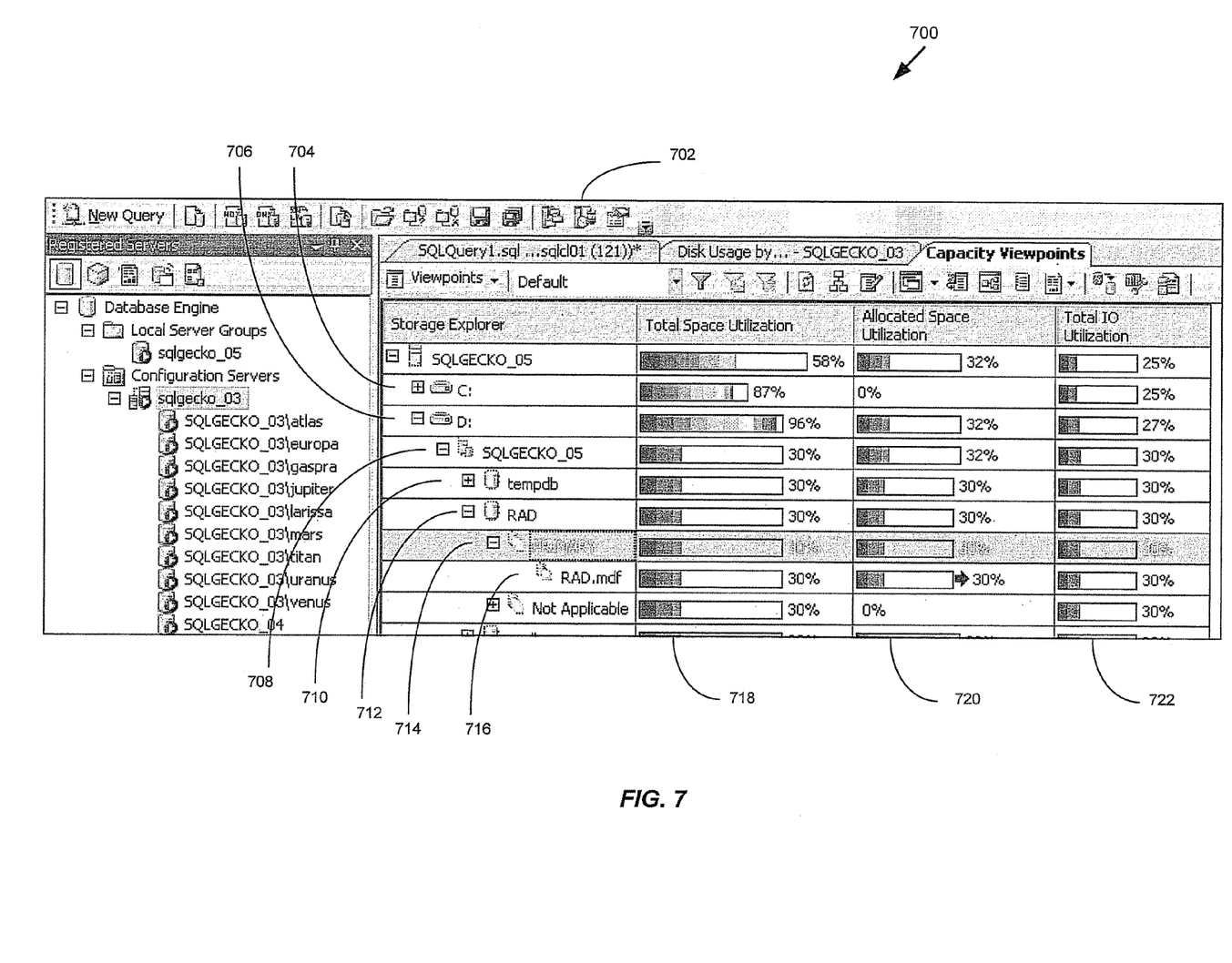
FIG. 7 is a screen view diagram to illustrate a particular embodiment of a visual display that includes a third dynamic utilization view of database components.

Referring to FIG. 7, a particular illustrative embodiment of a third view 700 displays hardware capacity utilization information related to hardware resource components supporting one or more database instances, operating system volumes, Microsoft SQL Server filegroups, or files.

In a particular embodiment, the third view 700 includes a third graphical user interface 702 that includes a first field that shows one or more storage components. For example, the third view 700 displays information for a first storage component 704 and for a second storage component 706. The first storage component 704 is named "C:" and the second storage component 706 is named "D:". The third view 700 also includes a second field that shows a Microsoft SQL Server instance 708. For example, in FIG. 7, the Microsoft SQL Server instance 708 is named "SQLGECKO_05". The third view 700 also includes a third field that shows one or more database applications including one or more Microsoft SQL Server instances, Microsoft SQL Server databases, Microsoft SQL Server filegroups or Microsoft SQL Server files. For example, the third view 700 displays information for a first Microsoft SQL Server database 710 and for a second Microsoft SQL Server database 712. The first Microsoft SQL Server database 710 is named "tempdb" and the second Microsoft SQL Server database 712 is named "RAD". As a further example, information for a first Microsoft SQL Server filegroup 714 is shown. The first Microsoft SQL Server filegroup 714 is named "PRIMARY". As another example, a first Microsoft SQL Server file 716 named "RAD.mdf" is also shown.

The third view 700 also includes a fourth field that shows one or more total hardware capacity utilization metrics of the one or more Microsoft SQL Server instances, Microsoft SQL Server databases, Microsoft SQL Server filegroups and Microsoft SQL Server files. For example, in FIG. 7, the third view 700 shows a first total hardware capacity utilization metric 718 and a second total hardware capacity utilization metric 722. For example, the first total hardware capacity utilization metric 718 in FIG. 7 is a total space utilization metric. As a further example, the second total hardware capacity utilization metric 722 in FIG. 7 is a total storage I/O utilization metric. The third view 700 also includes a fifth field that shows one or more allocated hardware capacity utilization metrics of the one or more Microsoft SQL Server instances, Microsoft SQL Server databases, Microsoft SQL Server filegroups and Microsoft SQL Server files. For example, the third view 700 shows a first allocated hardware capacity utilization metric 720. In the embodiment shown in FIG. 7, the first allocated hardware capacity utilization metric 720 is an allocated space utilization metric.

The third view 700, as well as other views, display capacity utilization based on models of the underlying components. The views may be created and customized dynamically. In a particular embodiment, the first view, the second view, the third view, and the fourth view are customizable to fit a particular domain of analysis by changing one or more of types, ordering, and filtering of hardware resource components displayed. For example, in the third view 700 in FIG. 7, the tree hierarchy extends from the first Microsoft SQL Server instance 708 to the second Microsoft SQL Server database 712 to the first Microsoft SQL Server filegroup 714 to the first Microsoft SQL Server file 716. As an example, a user may alter the third view 700 to display Microsoft SQL Server instances to Windows drives (e.g. first Microsoft SQL Server instance 708 to first storage component 704 and second storage component 706) for drives that are using more than 90% of the available space.

Referring to FIG. 8, a particular illustrative embodiment of a fourth view 800 displays information including hardware capacity utilization information related to hardware resource components supporting one or more Microsoft SQL Server instances or computer network interfaces.

In a particular embodiment, the fourth view 800 includes a fourth graphical user interface 802 that includes a first field that shows one or more computers. For example, the fourth view 800 shows a first computer 804, a second computer 806, and a third computer 808. The first computer 804 is named "SQLGECKO_03", the second computer 806 is named "SQLGECKO_04", and the third computer is named "SQLGECKO_05". The fourth view 800 also includes a second field that shows one or more network components. For example, the fourth view 800 shows a first network component 810, a second network component 812, and a third network component 814 related to the first computer 804. Further, the fourth view 800 shows a fourth network component 816, a fifth network component 818, and a sixth network component 820 that are related to the second computer 806. Further, the fourth view 800 shows a seventh network component 822, an eighth network component 824, and a ninth network component 826 that are related to the third computer 808.

As show in the fourth view 800 of FIG. 8, for example, the first network component 810 and the second network component 812 are computer network interface adapters associated with first computer 804. As a further example, the third network component 814 is a TCP loopback interface associated with first computer 804. The fourth network component 816 and the fifth network component 818 are virtual machine network services drives associated with the second computer 806. The sixth network component 820 is a transmission control protocol (TCP) loopback interface associated with the second computer 806. The seventh network component 822 and eighth network component 824 are virtual machine network services drivers associated with the third computer 808. The ninth network component 826 is a TCP loopback interface associated with the third computer 808.

The fourth view 800 also includes a third field that shows one or more network bandwidth utilization metrics of the one or more computers and the one or more network components. In the embodiment shown in FIG. 8, the third field shows a first total network bandwidth utilization metric 830.

In a particular embodiment, the first view, the second view, the third view, and the fourth view are customizable to fit a particular domain of analysis by changing one or more of types, ordering, and filtering of hardware resource components displayed. For example, referring to FIG. 8, a user may click on a first icon 840 to change the types or ordering of hardware resource components displayed. As shown by the first icon 840, a current ordering shown in FIG. 8 includes a default ordering. As another example, a user may click on a second icon 842 to filter the hardware resource components displayed.

Those of skill would further appreciate that the various illustrative logical blocks, configurations, modules, circuits, and algorithm steps described in connection with the embodiments disclosed herein may be implemented as electronic hardware, computer software, or combinations of both. To clearly illustrate this interchangeability of hardware and software, various illustrative components, blocks, configurations, modules, circuits, or steps have been described generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The steps of a method described in connection with the embodiments disclosed herein may be embodied directly in hardware, in a software module executed by a processor, or in a combination of the two. A software module may reside in computer readable media, such as random access memory (RAM), flash memory, read only memory (ROM), registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor or the processor and the storage medium may reside as discrete components in a computing device or computer system.

Although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments.

The Abstract of the Disclosure is provided with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments.

The previous description of the disclosed embodiments is provided to enable any person skilled in the art to make or use the disclosed embodiments. Various modifications to these embodiments will be readily apparent to those skilled in the art, and the generic principles defined herein may be applied to other embodiments without departing from the scope of the disclosure. Thus, the present disclosure is not intended to be limited to the embodiments shown herein but is to be accorded the widest scope possible consistent with the principles and novel features as defined by the following claims.

What is claimed is:

1. A system comprising:
   a processor including an interface to receive a resource governance rule applicable to one or more hardware resources supporting a monitored software application;
   utilization logic to:
   measure usage of a particular hardware resource by the monitored software application;
   determine an available utilization of the particular hardware resource based on the resource governance rule;
   determine a total utilization of the particular hardware resource; and
   determine one or more utilization metrics based on a historical usage of the particular hardware resource as compared to a governed capacity available to the particular hardware resource and a non-governed capacity available to the particular hardware resource;
   recommendation logic to determine a recommended action to be taken with respect to the monitored software application based on one or more rules; and
   prediction logic to estimate a predicted impact of executing the recommended action.

2. The system of claim 1, further comprising a user interface to display the one or more utilization metrics and the recommended action.

3. The system of claim 2, wherein the one or more utilization metrics includes a resource governed utilization of the particular hardware resource, and wherein the user interface displays the resource governed utilization of the particular hardware resource.

4. The system of claim 3, wherein the user interface further displays a contribution of each of one or more consumers of the particular hardware resource relative to the total utilization of the particular hardware resource and the resource governed utilization of the particular hardware resource.

5. The system of claim 1, wherein the one or more rules include one or more deployment configuration constraints and one or more resource allocation best practices.

6. The system of claim 1, wherein the recommended action includes one or more of re-allocating hardware resources of a first computer system, moving the files associated with the software application to a different storage system location, and moving the software application to a second computer system.

7. The system of claim 2, wherein the user interface further displays a predicted utilization view of related hardware resources and software applications of the system based on the predicted impact of executing the recommended action.

8. The system of claim 1, wherein the utilization logic detects a usage of the monitored software application that approaches a hardware resource limit, the violation of a deployment configuration constraint, or the violation of a resource allocation best practice before the usage exceeds the hardware resource limit the constraint or the best practice, and wherein the recommendation logic automatically executes the recommended action.

9. The system of claim 8, wherein automatically executing the recommended action includes one or more of re-allocating hardware resources of a first computer system, moving the files associated with the software application to a different storage system location, and moving the software application to a second computer system.

10. The system of claim 2, wherein the user interface includes a graphical user interface and a command line interface.

11. A method, comprising:
    identifying consumers of a resource;
    monitoring usage of the resource by each of the consumers of the resource;
    determining a total utilization of the resource by each of the consumers of the resource based on a model of the resource and of a computer system;
    determining a resource governed utilization of the resource by each of the consumers of the resource based on the model of the resource and of the computer system;
    displaying the total utilization of the resource and the resource governed utilization of the resource for each of the consumers of the resource in a single view; and
    determining a recommended action to be taken with respect to the resource in response to the resource governed utilization and the total utilization of the resource and determining a predicted impact of executing the recommended action on one or more elements of the computer system.

12. The method of claim 11, further comprising displaying a modified total utilization of the particular resource and a modified resource governed utilization of the particular resource for each of the consumers of the particular resource in the single view and displaying information that illustrates the predicted impact on the one or more elements of the computer system.

* * * * *

UNITED STATES PATENT AND TRADEMARK OFFICE
Certificate

Patent No. 8,112,366 B2　　　　　　　　　　　　　　　　　　　　　　　Patented: February 7, 2012

On petition requesting issuance of a certificate for correction of inventorship pursuant to 35 U.S.C. 256, it has been found that the above identified patent, through error and without any deceptive intent, improperly sets forth the inventorship.

Accordingly, it is hereby certified that the correct inventorship of this patent is: Matt Hollingsworth, Redmond, WA (US); Colleen Hamilton, Kirkland, WA (US); John M. Oslake, Redmond, WA (US); Shawn Bice, Sammamish, WA (US); and Narayan Nevrekar, Bellevue, WA (US).

Signed and Sealed this Twentieth Day of May 2014.

<div style="text-align: right;">

JEFFREY A. GAFFIN
*Supervisory Patent Examiner*
Art Unit 2129
Technology Center 2100

</div>